United States Patent
Köhler et al.

(10) Patent No.: US 7,371,463 B2
(45) Date of Patent: May 13, 2008

(54) SOL-GEL COATING FROM WATER-SOLUBLE OXALAMIDES

(75) Inventors: Burkhard Köhler, Leverkusen (DE); Harald Kraus, Leverkusen (DE); Joachim Simon, Düsseldorf (DE)

(73) Assignee: Bayer MaterialScience AG, Leverkusen (DE)

( * ) Notice: Subject to any disclaimer, the term of this patent is extended or adjusted under 35 U.S.C. 154(b) by 515 days.

(21) Appl. No.: 11/058,339

(22) Filed: Feb. 15, 2005

(65) Prior Publication Data

US 2005/0186436 A1    Aug. 25, 2005

(30) Foreign Application Priority Data

Feb. 19, 2004   (DE) ................... 10 2004 008 056

(51) Int. Cl.
*B32B 25/20* (2006.01)

(52) U.S. Cl. .................... 428/447; 528/38; 528/23

(58) Field of Classification Search ............... 528/38, 528/23; 428/447
See application file for complete search history.

(56) References Cited

U.S. PATENT DOCUMENTS

| | | | | |
|---|---|---|---|---|
| 5,271,769 | A | 12/1993 | Bugnon et al. | 106/419 |
| 5,302,735 | A * | 4/1994 | Neri et al. | 556/419 |
| 6,020,448 | A | 2/2000 | Jenkner et al. | 528/26 |
| 6,136,939 | A | 10/2000 | Mager et al. | 528/33 |
| 6,420,029 | B1 | 7/2002 | Tavernier et al. | 428/407 |
| 6,673,458 | B2 | 1/2004 | Mager et al. | 428/450 |

OTHER PUBLICATIONS

Journal of Non-Crystalline Solids, 48 (month unavailable) 1982, pp. 11-16, Helmut Dislich et al, "History and Principles of the Sol-Gel Process, and some new Multicomponent Oxide Coatings".
Analytical Chemisty, vol. 28, No. 12, Dec. 1956, pp. 1981-1983, George W. Sears, Jr., "Determination of Specific Surface Area of Colloidal Silica by Titration with Sodium Hydroxide".

* cited by examiner

*Primary Examiner*—Kuo-Liang Peng
(74) *Attorney, Agent, or Firm*—Noland J. Cheung; Robert S. Klemz

(57) ABSTRACT

Coating compositions for producing sol-gel coatings that include:
a) one or more alkoxysilyl-containing oxalamides of the general formula (II),

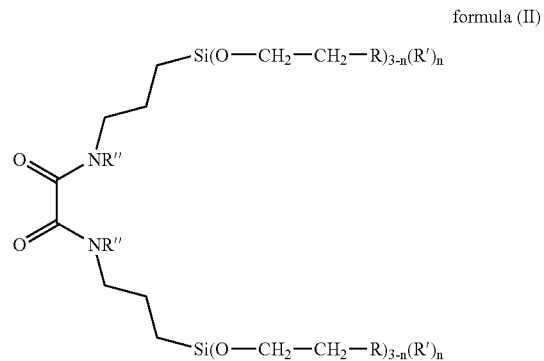

where
R" is hydrogen or an organic $C_1$-$C_{10}$ radical,
R' radicals are organic, optionally oxygen-attached $C_1$-$C_{10}$ radicals,
R is an oxygen-attached radical optionally containing one or more ether groups and having 1 to 30 carbon atoms and
n is an integer between 0 and 2,
b) optionally further crosslinkers,
c) one or more catalysts and
d) water. The sol-gel coatings are produced by a method that includes combining a silica sol and one or more alkoxysilyl-containing oxalamides. The sol-gel coatings obtained from the above-described coating compositions can be used to coat substrates.

20 Claims, No Drawings

SOL-GEL COATING FROM WATER-SOLUBLE OXALAMIDES

CROSS REFERENCE TO RELATED PATENT APPLICATION

The present patent application claims the right of priority under 35 U.S.C. § 119 (a)-(d) of German Patent Application No.10 2004 008 0569, filed Feb. 19, 2004.

BACKGROUND OF THE INVENTION

1. Field of the Invention

The invention relates to coatings on a sol-gel basis, formed from silane-functional oxalamides which have been hydrophilicized by way of alkoxyalkyl radicals.

2. Description of the Prior Art

Sol-gel condensates are frequently employed for coatings. They are prepared by mixing suitable compounds of low molecular mass with crosslinkable groups in a solvent, then adding water and catalysts if desired to initiate the hydrolysis and/or condensation reaction. The conduct of such sol-gel operations is known in principle to the skilled worker and described for example in Journal of Non-Crystalline Solids 48 (1982) 11-16. A drawback of the prior art systems, however, is that in general it is necessary to add organic solvents, since the low molecular mass compounds used are not, or not fully, miscible with water. Frequently, however, for many applications, the use of organic solvents is specifically unwanted.

An object which therefore existed was that of finding water-soluble compounds which react by hydrolysis and condensation to form crosslinked sol-gel materials and can be used to coat substrates.

Oxalamides of the general formula (I)

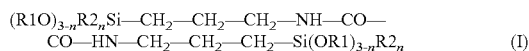

$$(RIO)_{3-n}R2_nSi-CH_2-CH_2-CH_2-NH-CO-CO-HN-CH_2-CH_2-CH_2-Si(OR1)_{3-n}R2_n \quad (I)$$

are known in principle. EP-A 729 963 and CA-A 2 087 227 describe them as polymer additives and antioxidants, but without giving any indications whatsoever of their possible use for producing water-based sol-gel coatings.

SUMMARY OF THE INVENTION

The present invention is directed to a method of producing sol-gel coatings. The method includes combining a silica sol and one or more alkoxysilyl-containing oxalamides.

The present invention also provides coating compositions for producing sol-gel coatings that include:

a) one or more alkoxysilyl-containing oxalamides of the general formula (II), formula (II)

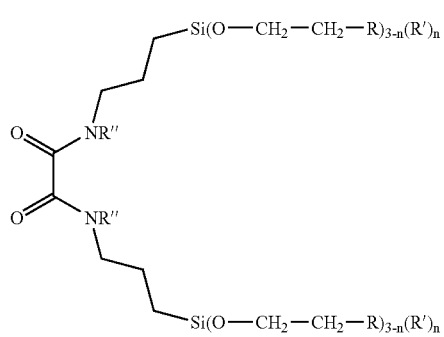

where
R" is hydrogen or an organic $C_1$-$C_{10}$ radical,
R' radicals are organic, optionally oxygen-attached $C_1$-$C_{10}$ radicals,
R is an oxygen-attached radical optionally containing one or more ether groups and having 1 to 30 carbon atoms and
n is an integer between 0 and 2,
b) optionally further crosslinkers,
c) one or more catalysts and
d) water.

The present invention also provides sol-gel coatings obtained from the above-described coating compositions and method as well as substrates coated with the sol-gel coatings.

DETAILED DESCRIPTION OF THE INVENTION

Other than in the operating examples, or where otherwise indicated, all numbers or expressions referring to quantities of ingredients, reaction conditions, etc. used in the specification and claims are to be understood as modified in all instances by the term "about."

It has now been found that suitably substituted oxalamides not only are soluble in water but also are suitable for producing water-based sol-gel coatings having excellent properties.

The invention accordingly provides for the use of alkoxysilyl-containing oxalamides as crosslinkers in producing sol-gel coatings.

The invention further provides coating compositions for producing sol-gel coatings, at least comprising one or more alkoxysilyl-containing oxalamides of the general formula (II), formula (II)

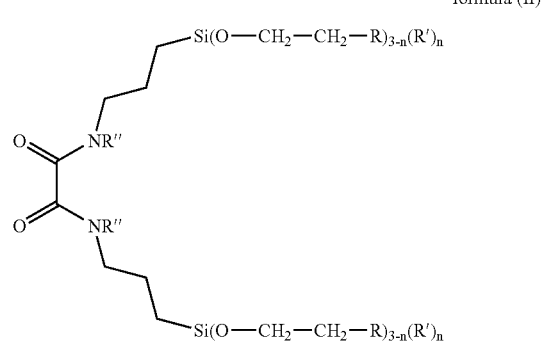

where
R" is hydrogen or an organic $C_1$-$C_{10}$ radical,
R' radicals are organic, optionally oxygen-attached $C_1$-$C_{10}$ radicals,
R is an oxygen-attached radical optionally containing one or more ether groups and having 1 to 30 carbon atoms and
n is an integer between 0 and 2,
optionally further crosslinkers,
one or more catalysts and water.

The oxalamides of the formula (II) may be symmetrical or else asymmetrical in construction. In the case of symmetrical oxalamides both Si-containing amidically bonded groups are of identical construction, whereas in the case of asymmetrical oxalamides at least one of the radicals R, R' and R" or the number n of amidically bonded groups is different. Preferably the oxalamides are of symmetrical construction.

Preferred oxalamides are those of the aforementioned kind of formula (II) where
R" is methyl or hydrogen,
R' groups are optionally oxygen-attached methyl, ethyl or propyl groups,
R is an alkoxyalkyl radical having 1 to 3 carbon atoms and
n is 0, 1 or 2.

Particularly preferred oxalamides are those of the aforementioned kind of formula (II) where
R" is hydrogen,
R' is an optionally oxygen-attached methyl or ethyl group,
R is methoxy and
n is 0 or 1.

The oxalamides for use in accordance with the invention are normally obtained by reacting oxalic acid or esters thereof with aminopropylalkoxysilanes of the formula (III)

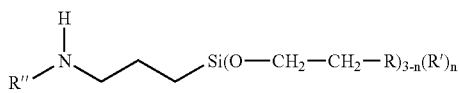

formula (III)

where R, R', R" and n are as defined above.

Preference is given to using oxalic acid dialkyl esters, more preferably diethyl oxalate, as the oxalic acid source.

The two reactants are reacted, optionally using a solvent, at temperatures of preferably 15 to 150° C., more preferably 20 to 40° C.

The alcohol liberated in the course of the reaction is removed by distillation, preferably under reduced pressure. If the distillative removal of the elimination product is carried out during the formation of amide, the end of the reaction can be ascertained from the fact that elimination product is no longer distilled over. This procedure additionally has the advantage that, owing to the equilibrium shift associated with it, the conversion of both reactants is quantitative, i.e. >99%, preferably >99.5%.

Normally two moles of the aminopropylalkoxysilane of the formula (III) are used per mole of oxalic acid and/or oxalic ester. If desired, however, it is possible to deviate from these stoichiometric quantities and to add a greater or lesser amount of aminopropylalkoxysilane.

Following the actual formation of amide and the distillative removal of the elimination product, the crude product can be processed further without additional purification. If necessary, however, it can also be purified beforehand by the customary methods such as chromatography or recrystallization.

The aminopropylalkoxysilanes of the formula (III) can be prepared by transesterification from aminopropylalkoxysilanes of the formula (IV)

formula (IV)

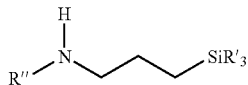

where R' and R" are as defined above, the radicals R' are identical or different and at least one R' is a radical of the aforementioned kind which is oxygen-attached to Si.

For this purpose the compounds of the formula (IV), optionally in a solvent which is inert towards alkoxy groups, are introduced as an initial charge and the desired amount of an alcohol of the general formula (V)

formula (V)

is added, R being as defined above.

The reaction temperature in this case is typically 70 to 140° C., preferably 80 to 120° C.

If desired it is also possible to add acidic or basic catalysts such as p-toluenesulphonic acid, sulphuric acid, phosphoric acid, KOH, NaOH, $K_2CO_3$ or $Na_2CO_3$. If desired these catalysts can be used as they are, in bulk, or as a solution in organic and/or aqueous solvents.

The amounts of catalyst are 0.01% to 3% by weight, preferably 0.5% to 2% by weight, based on the aminopropylsilanes of the formula (IV).

Basic catalysts of the aforementioned kind are preferred.

The alcohol eliminated in this reaction is removed by distillation, preferably under reduced pressure.

Normally the molar ratio of aminopropylalkoxysilane radicals oxygen-attached to Si to the amount of alcohol of the formula (V) used is 1:1. In order, however, to achieve a quantitative exchange of the Si-bonded alkoxy groups for O—$CH_2$—$CH_2$—R as quickly as possible it is advantageous to operate with an excess of alcohol of the formula (V). This ratio, however, may also if desired be below 1:1, in which case not all of the alkoxy groups are replaced by O—$CH_2$—$CH_2$—R. This approach, though possible, is not preferred.

As aminopropylalkoxysilanes of the formula (IV) it is preferred to use aminopropyltrialkoxysilanes having 1 to 3 carbon atoms per alkoxy group and aminopropyldialkoxyalkylsilanes having 1 to 3 carbon atoms per alkoxy and alkyl group respectively.

As compounds of the formula (IV) is it possible for example to us aminopropyltrimethoxysilane, aminopropyltriethoxysilane, aminopropylmethyldimethoxysilane, aminopropylmethyldiethoxysilane, aminopropyldimethylmethoxysilane or aminopropyldimethylethoxysilane. As alcohols of the formula (V) it is preferred to use alkoxy-containing alcohols having 1-3 carbon atoms in the alkoxy radical. Particular preference is given to methoxyethanol.

After the actual transesterification and distillative removal of the elimination product the crude product is purified, preferably by means of vacuum distillation, and in that way the aminopropylalkoxysilane is isolated.

As further crosslinkers in the coating compositions of the invention it is possible in component B) to use water-soluble or water-emulsifiable alkoxysilanes, water-soluble or water-emulsifiable organic polymers and/or aqueous or alcoholic dispersions of $SiO_2$ particles having diameters in the nanometer range ("silica sols").

Examples of water-soluble or water-emulsifiable alkoxysilanes are those of the formula (VI)

formula (VI)

where R and R' are as already defined above and m is an integer from 4 to 0, preferably 3 to 0, more preferably 1 or 0.

One particularly preferred water-soluble or water-emulsifiable alkoxysilane is tetra(methoxyethoxy)silane.

As water-soluble or water-emulsifiable organic polymers it is possible to use carboxymethylcellulose, hydroxyethylstarch, polyvinyl alcohol, hydroxyethylcellulose, hydroxypropylcellulose, hydroxyethylmethylcellulose, borate-modified shellac, copolymers or homopolymers of acrylic acid or methacrylic acid, copolymers or homopolymers of acrylamide or methacrylamide, copolymers or homopolymers of N-isopropylacrylamide, copolymers or homopolymers of dimethylacrylamide, copolymers or homopolymers of hydroxypropyl or hydroxyethyl acrylate or methacrylate, copolymers or homopolymers of the (meth)acrylates of polyethylene glycol methyl ethers, polyalkylene ethers formed from the oxiranes ethylene oxide, propylene oxide or glycidol, or polyurethane dispersions.

Suitable silica sols are silicon dioxide dispersions based on silica sol, silica gel, pyrogenic silicas or precipitated silicas or mixtures of these.

Silica sols are colloidal solutions of amorphous silicon dioxide in water, which are also referred to as silicon dioxide sols but usually for short as silica sols. The silicon dioxide in this case is in the form of spherical particles which are hydroxylated at the surface. The diameter of the colloidal particles is generally 1 to 200 nm, the specific BET surface area (determined by the method of G. N. Sears, Analytical Chemistry Vol. 28, No.12, 1981-1983, December 1956), correlating to the particle size, being 15 to 2000 m$^2$/g. The surface of the SiO$_2$ particles has a charge which is compensated by a corresponding counterion, leading to the stabilization of the colloidal solution. The alkali-stabilized silica sols possess a pH of 7 to 11.5 and as alkalizing agents contain for example small amount of Na$_2$O, K$_2$O, Li$_2$O, ammonia, organic nitrogen bases, tetraalkyl-ammonium hydroxides or alkali metal or ammonium aluminates. Silica sols may also be in a weakly acidic form as semi-stable colloidal solutions. Further it is possible to prepare cationically formulated silica sols, by coating the surface with Al$_2$(OH)$_5$Cl. The solids concentrations of the silica sols are 5% to 60% by weight SiO$_2$.

The preparation operation for silica sols covers essentially the production steps of dealkalizing waterglass by ion exchange, setting and stabilizing the particular desired particle size (distribution) of the SiO$_2$ particles, setting the particular desired SiO$_2$ concentration and, optionally, modifying the surface of the SiO$_2$ particles, such as with Al$_2$(OH)$_5$Cl, for example. In none of these steps do the SiO$_2$ particles leave the colloidally dissolved state. This explains the presence of the discrete primary particles with, for example, high binder effectiveness.

Suitable silica sols based on precipitated silicas are available under the name Levasil® from. H. C. Starck, Leverkusen, DE As catalysts in component C) it is possible to utilize all of the compounds, known per se to the skilled worker from the Chemistry of Sol-Gel Materials, for accelerating the hydrolysis and condensation reaction of the alkoxysilanes. Mention may be made preferably here of organic acid such as sulphonic acids. Particular preference is given to p-toluenesulphonic acid.

Component C) is added in amounts of 0.05% to 5% by weight, preferably of 0.1% to 1% by weight, based on the solids content of the coating.

Besides components A)-D) the coating compositions of the invention may also comprise the auxiliaries and additives customary per se from paint chemistry, such as levelling assistants, light stabilizers such as HALS amines, UV absorbers, pigments, dyes or active biocidal substances.

The coating compositions of the invention are suitable for producing coatings having resistance properties on, for example, wood, ceramic, glass, metals, plastics or else other mineral substrates.

Application may be made by any common techniques such as brushing, spraying, rolling, spin coating or dipping.

Application is followed by curing of the coating at temperatures of preferably 30° C. to 200° C.

In this way it is possible to obtain coatings of high scratch resistance, chemical resistance and solvent resistance, which additionally have repellency properties (anti-graffiti, fouling release). These coatings are likewise provided by this invention.

EXAMPLES

The aqueous silica sol used, Levasil® 200S/30, was obtained from H. C. Starck, Leverkusen, DE. It is a dispersion of amorphous SiO$_2$ nanoparticles (30% by weight SiO$_2$, mean particle size 15 nm, BET surface area 200 m$^2$/g) stabilized cationically with aluminium salts. Prior to use the pH of Levasil® 200S/30 was adjusted from 3.8 to 2 by adding concentrated hydrochloric acid.

The coatings were applied to glass by means of a film-drawing frame (doctor blade) and cured at room temperature or in a forced-air cabinet.

Effectiveness as an anti-graffiti coating was tested by exposing it to a 1% strength by weight solution of fuchsin in 1:1:1 water/ethanol/butyl glycol for one hour. The dry film was wiped off with a paper cloth soaked in ethanol, and remaining dye was classified visually. No discernible fuchsin residues were reported with "removed without residue".

The pendulum hardness was determined by the method of König (DIN 53157).

Example 1

Preparation of Aminopropyl(trismethoxyethoxy)silane

A mixture of 800 g of aminopropyltrimethoxysilane, 2000 g of methoxyethanol and 8 g of KOH powder was heated at 100° C. for 16 h, methanol being distilled off via a Vigreux column. The excess methoxyethanol was then removed by distillation, after which the product distilled over at 165° C. and 1.5 mbar. This gave 1010 g of aminopropyl(trismethoxyethoxy)silane.

Example 2

Preparation of Aminopropyl(methyl)(bismethoxyethoxy)silane

A mixture of 100 g of aminopropyl(methyl)diethoxysilane, 200 g of methoxyethanol and 1 g of KOH powder was heated at 110° C. for 16 h, the ethanol eliminated being distilled off via a Vigreux column. The excess methoxyethanol was then removed by distillation, after which the product distilled over at 118° C. and 0.17 mbar. This gave 97 g of aminopropyl(methyl)(bismeth-oxyethoxy)silane.

Example 3

Preparation of a Symmetrical Oxalamide of the Formula (II) with R=Methoxy and n=0

A mixture of 1 mol of aminopropyl(trismethoxyethoxy) silane and 0.5 mol of diethyl oxalate was stirred at room temperature for 1 week. The ethanol formed was then stripped off in vacuo. The desired amide, whose structure was verified by means of 1H-NMR spectroscopy, was obtained in quantitative yield.

Example 4

Preparation of a Symmetrical Oxalamide of the Formula (II) with R=Methoxy, R'=Methyl and n=1

A mixture of 1 mol of aminopropyl(methyl)(bismethoxyethoxy)silane and 0.5 mol of diethyl oxalate was stirred at room temperature for 1 week. The ethanol formed was then stripped off in vacuo. The desired amide, whose structure was verified by means of 1H-NMR spectroscopy, was obtained in quantitative yield.

Example 5

8 g of Levasil® 200S/30 (adjusted with conc. HCl to a pH of 2) were diluted with 8 g of H$_2$O, then 12 g of the compound of the formula (II) from Example 3 (with R=methoxy and n=0) and 0.12 g of levelling assistant BYK® 306 (Byk Chemie, Wesel, DE) were added, and the mixture was stirred briefly and then left to stand in a closed vessel at room temperature. After 3 hours a glass plate was coated with a wet film thickness of 120 μm and dried at room temperature. This gave a clear, smooth film.

After 24 h of storage at room temperature the test with the fuchsin solution was carried out. It was possible to eliminate the dye without residue.

Example 6

8 g of Levasil® 200S/30 (adjusted with conc. HCl to a pH of 2) were diluted with 8 g of H$_2$O, then 12 g of the compound of the formula (II) from Example 3 (with R=methoxy and n=0) and 0.12 g of levelling assistant BYK 306 (Byk Chemie, Wesel, DE) were added, and the mixture was stirred briefly and then left to stand in a closed vessel at room temperature. After 3 hours three glass plates were coated with a wet film thickness of 120 μm and dried as follows:

1 h 60° C.
1 h 100° C.
1 h 130° C.

The cured coatings were found to have the following pendulum hardnesses (by the König method):

148 sec
179 sec
192 sec

Example 7

3.5 g of the compound of the formula (II) from Example 3 (with R=methoxy and n=0) were dissolved in 2 g of H$_2$O and, with stirring, 6.78 g of tetramethoxyethoxysilane and subsequently 2 g of 0.1 N p-toluenesulphonic acid (in water) were added, and the mixture was stirred briefly and then left to stand at room temperature in a closed vessel. After 1.5 hours a glass plate was coated with a wet film thickness of 120 μm and dried at room temperature overnight. The dry film thickness was approximately 12 μm, a pendulum hardness of 245 sec was measured and after the test with the fuchsin solution it was possible to eliminate the dye without residue.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A method of producing sol-gel coatings comprising combining a silica sol and one or more alkoxysilyl-containing oxalamides.

2. The method according to claim 1, further comprising combining optionally further crosslinkers, one or more catalysts and water.

3. The method according to claim 2, wherein the further crosslinkers include water-soluble or water-emulsifiable alkoxysilanes, water-soluble or water-emulsifiable organic polymers and/or aqueous or alcoholic silica sols.

4. The method according to claim 2, wherein the catalyst includes p-toluenesulphonic acid.

5. The method according to claim 1, wherein the one or more alkoxysilyl-containing oxalamides corresponds to the general formula (II),

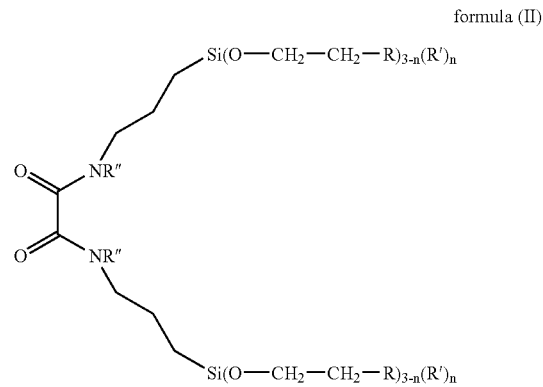

formula (II)

where

R" is hydrogen or an organic $C_1$-$C_{10}$ radical,

R' radicals are organic, optionally oxygen-attached $C_1$-$C_{10}$ radicals,

R is an oxygen-attached radical optionally containing one or more ether groups and having 1 to 30 carbon atoms and n is an integer between 0 and 2.

6. The method according to claim 5, wherein the oxalamides are of the stated formula (II) where R" is hydrogen, R' is an optionally oxygen-attached methyl or ethyl group, R is methoxy and n is 0 or 1.

7. Sol-gel coatings obtained from the method of claim 1.

8. Substrates coated with sol-gel coatings according to claim 7.

9. Coating compositions for producing sol-gel coatings comprising a) one or more alkoxysilyl-containing oxalamides of the general formula (II),

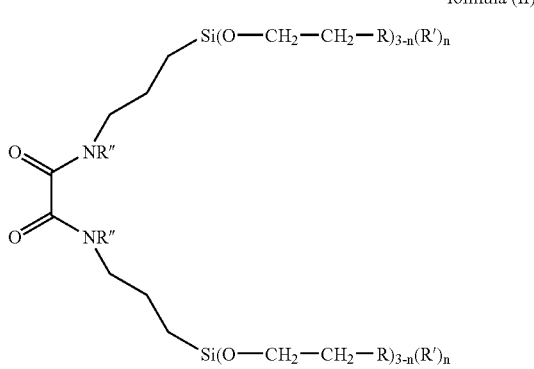

formula (II)

where
R'' is hydrogen or an organic $C_1$-$C_{10}$ radical,
R' radicals are organic, optionally oxygen-attached $C_1$-$C_{10}$ radicals,
R is an oxygen-attached radical optionally containing one or more ether groups and having 1 to 30 carbon atoms and
n is an integer between 0 and 2,
b) optionally further crosslinkers,
c) one or more catalysts and
d) water.

10. Coating compositions for producing sol-gel coatings according to claim 9, wherein the oxalamides of component A) are of the stated formula (II) where
R'' is hydrogen,
R' is an optionally oxygen-attached methyl or ethyl group,
R is methoxy and
n is 0 or 1.

11. Coating compositions for producing sol-gel coatings according to claim 10, wherein the further crosslinkers in component b) include water-soluble or water-emulsifiable alkoxysilanes, water-soluble or water-emulsifiable organic polymers and/or aqueous or alcoholic silica sols.

12. Coating compositions for producing sol-gel coatings according to claim 10, wherein the catalyst c) includes p-toluenesulphonic acid.

13. Coating compositions for producing sol-gel coatings according to claim 9, wherein the further crosslinkers in component b) include water-soluble or water-emulsifiable alkoxysilanes, water-soluble or water-emulsifiable organic polymers and/or aqueous or alcoholic silica sols.

14. Coating compositions for producing sol-gel coatings according to claim 13, wherein the catalyst c) includes p-toluenesulphonic acid.

15. Coating compositions for producing sol-gel coatings according to claim 9, wherein the catalyst c) includes p-toluenesulphonic acid.

16. Sol-gel coating obtained from coating compositions according to claim 9.

17. Substrates coated with sol-gel coatings according to claim 16.

18. The coating compositions according to claim 9, further comprising auxiliaries and additives selected from the group consisting of leveling assistants, light stabilizers, UV absorbers, pigments, dyes, and combinations thereof.

19. Sol-gel coatings obtained from combining a silica sol and one or more alkoxysilyl-containing oxalamides.

20. Substrates coated with sol-gel coatings according to claim 19.

* * * * *